United States Patent [19]

Hatata et al.

[11] Patent Number: 4,481,629
[45] Date of Patent: Nov. 6, 1984

[54] ABNORMAL SIGNAL DETECTING DEVICE

[75] Inventors: Minoru Hatata; Tadahiro Gouda, both of Hyogo, Japan

[73] Assignee: Mitsubishi Denki Kabushiki Kaisha, Tokyo, Japan

[21] Appl. No.: 552,019

[22] Filed: Nov. 17, 1983

Related U.S. Application Data

[63] Continuation of Ser. No. 261,209, May 6, 1981, abandoned.

[30] Foreign Application Priority Data

Dec. 12, 1979 [JP] Japan .................. 54-163017

[51] Int. Cl.³ .............. G01R 19/00; G06F 11/00
[52] U.S. Cl. .................. 371/57; 307/357; 328/132; 328/151; 361/86; 371/67; 340/347 AD
[58] Field of Search .......... 371/57, 67; 324/78 D, 324/78 Q, 78 Z, 77 A, 77 G, 51; 328/132, 135, 150, 151; 307/357; 361/86; 364/481, 487, 483; 340/347 AD

[56] References Cited

U.S. PATENT DOCUMENTS

| | | | |
|---|---|---|---|
| 3,334,298 | 8/1967 | Monrad-Krohn | 324/77 A |
| 3,424,940 | 1/1969 | Foote | 324/77 A |
| 3,623,076 | 11/1971 | Moffitt | 340/347 AD |
| 3,683,115 | 8/1972 | Schellenberg | 370/15 |
| 3,753,133 | 8/1973 | Shumate, Jr. | 328/132 |
| 3,893,617 | 7/1975 | Solberg | 371/62 |
| 3,927,309 | 12/1975 | Fujiwara et al. | 235/135 |
| 4,008,405 | 2/1977 | Neumann et al. | 328/132 |
| 4,031,464 | 6/1977 | Norberg | 328/150 |
| 4,032,766 | 6/1977 | Hughes et al. | 361/86 |
| 4,041,404 | 8/1977 | Lewis, Jr. | 328/150 |
| 4,132,947 | 1/1979 | Weischedel et al. | 324/77 A |
| 4,152,642 | 5/1979 | Doherty | 324/77 A |
| 4,158,809 | 6/1979 | Dellamano | 324/99 D |
| 4,283,713 | 8/1981 | Phillip | 328/151 |

FOREIGN PATENT DOCUMENTS

| | | |
|---|---|---|
| 50-66142 | 6/1975 | Japan . |
| 51-92143 | 8/1976 | Japan . |
| 51-92144 | 8/1976 | Japan . |
| 52-10748 | 1/1977 | Japan . |

Primary Examiner—Charles E. Atkinson
Attorney, Agent, or Firm—Oblon, Fisher, Spivak, McClelland & Maier

[57] ABSTRACT

An abnormal signal detecting device, comprising a signal sampling and conversion circuit for sampling a predetermined number of data points along an analog signal and generating digital sampled data signals representative thereof; a memory circuit, connected to the signal sampling and conversion circuit, for storing the digital sampled data; and a consistency detecting circuit, connected to the memory circuit, for comparing at least three consecutive digital sampled data signals and generating an output representing an abnormal condition whenever at least three consecutive digital sampled data signals are the same.

2 Claims, 1 Drawing Figure

ABNORMAL SIGNAL DETECTING DEVICE

This application is a continuation of application Ser. No. 261,209, filed May 6, 1981 now abandoned.

BACKGROUND OF THE INVENTION

1. Field of the Invention:

The present invention relates to an abnormal signal detecting device which detects the abnormal state of a device by sampling, at periodic intervals, each cycle of an AC signal.

2. Description of the Prior Art:

In the device for sampling periodical AC signals such as current signals in a power system at constant intervals of each signal cycle (usually 30 degree interval) which performs digital conversion and feeds the data into a digital processing device, there is a possibility that the sampled data will not have a constant periodical property and that the data on both sides of the center of the peak value will not be consistent in view of the characteristics of the current signals.

When three consecutive data signals are the same, there is a possibility of an abnormal state in the sampling circuit or the digital conversion circuit etc.

The conventional test for the operation of a device for sampling such current signals in the power system is performed by switching, the input of the device to the test side and feeding known test signals into the device in order to test the output of the device. However, this method is impractical to test the state of the operation of the device from the precise viewpoint that the input is fed from the test side. Therefore, such method has a disadvantage in that it provides test results of low reliability.

SUMMARY OF THE INVENTION

The present invention overcomes the above-mentioned disadvantages of the conventional adevice and the object of the present invention is to provide an abnormal signal monitoring device which can detect the abnormal state of a device comprising a sampling circuit and a digital conversion circuit with an error of data by testing the consistency of continuous n consecutive data signals (n≧3) obtained by sampling in view of characteristics of periodical AC signals input into the device.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views and wherein:

The drawing is a block diagram of one embodiment of an abnormal signal detecting device according to the present invention.

DETAILED DESCRIPTION OF THE PREFERRED EMBODIMENT

Figure 1:
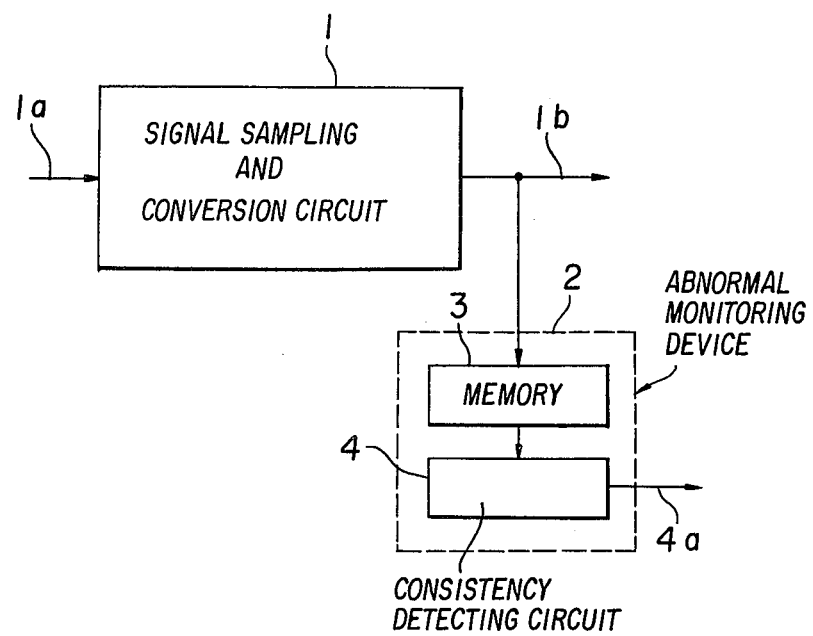

Referring to the drawing, one embodiment of the present invention will be illustrated. In the drawing, signal sampling and conversion device (1) comprises a sampling circuit such as a sample and hold circuit well known in the art for sampling AC signals (1a) of the input electric power system each 30 degree of the cycle and a digital conversion circuit such as an analog to digital converter well known in the art for digitally converting signals output from the sampling circuit. The data given by the digital conversion circuit are input as the signals (1b) into an outer digital device (not shown) and the abnormal monitoring device (2). The abnormal monitoring device (82) comprises a memory circuit (3) for recording n consecutive signals (n≧3) such as three consecutive signals (for three samples) (1b) and a consistency detecting circuit (4) such as a comparator well known in the art for testing the consistency of the data signals for three samples stored in the memory circuit (3) and to output a "1" signal (4a) to indicate an abnormal state when the three samples are the same.

In operation, if the signal sampling and conversion device (1) detects a normal state, three consecutive consistent data signals are not present as the signals (1b) in view of the characteristics of the AC signals (1a). However, if the signal sampling and conversion detects an abnormal state, in which three consecutive data signals (1b) are consistent, the data of the memory circuit (3) will be the same. This state is detected by the consistency detecting circuit (4) and a "1" signal (4a) is generated to indicate the abnormal state. When the input is zero, the abnormal monitoring device is also operated. This trouble can be overcome by the memorization of the contact condition of a breaker or an interrupter for the condition. The addition of the condition for the breaker or the interrupter can be attained by connecting a discrimination circuit or can be given by another manner.

The present invention can be applied for monitoring fault of an analog data input part of a digital processing device.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An abnormal signal detecting device, comprising:
   a sampling circuit means for sampling a predetermined number of data points along alternating current (AC) signal and generating digital sampled data signal representative thereof;
   memory means, connected to said sampling circuit means, for storing said digital sampled data;
   consistency detecting circuit means, connected to said memory means, for comparing at least three consecutive digital sampled data signals and generating an output representing an abnormal condition whenever said at least three consecutive digital sampled data signals are the same.
2. An abnormal signal detecting device, according to claim 3, wherein:
   said sampled data signals are sampled at 30° intervals along each cycle of said AC signal.

* * * * *